(12) United States Patent  
Lin et al.

(10) Patent No.: US 7,758,194 B2
(45) Date of Patent: Jul. 20, 2010

(54) LIGHT SOURCE ADJUSTING DEVICE

(75) Inventors: Chia-Jui Lin, Taipei (TW);
Ching-Liang Chen, Yilan County (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 572 days.

(21) Appl. No.: 11/420,857

(22) Filed: May 30, 2006

(65) Prior Publication Data

US 2007/0002288 A1  Jan. 4, 2007

(30) Foreign Application Priority Data

Jul. 1, 2005   (TW) ................ 94122481 A

(51) Int. Cl.
*G03B 21/20*   (2006.01)
(52) U.S. Cl. ........................ 353/87; 362/523
(58) Field of Classification Search ............... 353/25, 353/26 A, 26 R, 27 A, 27 R, 82, 86, 87, 119, 353/122; 362/285, 286, 287, 289, 290, 291, 362/292, 293, 269, 270, 273, 277, 372, 523, 362/529, 530, 531, 532
See application file for complete search history.

(56) References Cited

U.S. PATENT DOCUMENTS

| 930,209 | A | * | 8/1909 | Mills ........................... 352/198 |
| 980,639 | A | * | 1/1911 | Hughes ........................ 314/52 |
| 1,130,451 | A | * | 3/1915 | Unger ......................... 362/261 |
| 1,654,391 | A | * | 12/1927 | Thornton ..................... 352/198 |
| 5,825,548 | A | * | 10/1998 | Bornhorst et al. ........... 359/578 |
| 6,467,911 | B1 | * | 10/2002 | Ueyama et al. ............... 353/87 |
| 6,786,605 | B2 | * | 9/2004 | DeSisti et al. ............... 353/119 |
| 6,953,270 | B1 | * | 10/2005 | Richardson ................. 362/371 |
| 7,188,959 | B2 | * | 3/2007 | Clark et al. ................. 353/119 |
| 7,443,583 | B2 | | 10/2008 | Yamauchi |
| 2002/0075693 | A1 | * | 6/2002 | Rosenhahn et al. ......... 362/513 |
| 2006/0181876 | A1 | * | 8/2006 | Maes et al. ................. 362/285 |

FOREIGN PATENT DOCUMENTS

JP   2005326824 A   11/2005

* cited by examiner

*Primary Examiner*—Georgia Y Epps
*Assistant Examiner*—Bao-Luan Le
(74) *Attorney, Agent, or Firm*—Volpe and Koening, P.C.

(57) ABSTRACT

A light source adjusting device for a projector is provided. The light source adjusting device includes a base; an adjusting frame having a containing housing; a lamp disposed inside the containing housing as a light source of the projector; a connecting frame connected between the base and the adjusting frame; a first adjusting element disposed on the base and connected with the connecting frame; and a second adjusting element disposed on the base and connected with the adjusting frame, wherein the second adjusting element and the first adjusting element are disposed coplanarly, and a position of the connecting frame is adjusted by adjusting the first adjusting element and a position of the adjusting frame is adjusted by adjusting the second adjusting element, thereby driving the lamp so as to adjust a focal position of the light source adjusting device.

15 Claims, 7 Drawing Sheets

LIGHT SOURCE ADJUSTING DEVICE

FIELD OF THE INVENTION

The invention relates to a light source adjusting device, and more particularly to a light source adjusting device for a projector.

BACKGROUND OF THE INVENTION

To keep abreast with the constantly progressive optical technology, currently the projectors are applied extensively in various occasions, e.g. the conference, technical seminar and demonstration, to present the multimedia image contents. For presenting the projected image clearly and vividly, the projection brightness of the projector is a very important consideration. By and large, the higher the projection brightness is, the better the projection effect will be. Consequently, how to use a simple and convenient method to improve the brightness of the light source inside the projector, as well as how to adjust and calibrate the light source to the optimal focal position have become extremely important issues.

The digital light processing (DLP) projector utilizes the beam splitter to separate the light provided by the light source adjusting device (i.e. the lamp of the projector) into three primary colors and then combine the beams and mix the colors, thereby generating the required optical image. The light source adjusting device plays a significantly critical role in providing the brightness and the uniformity of light. As a consequence, for providing the projector with a better projection image quality, the light source adjusting device thereof is as important as the optical lens thereof.

Please refer to FIG. 1, which is a schematic view showing the light source adjusting device of the conventional projector. The light source adjusting device 10 includes a lamp 11 whose front end is directly fastened on the frame 13 through the screw 12. The lamp 11 is disposed inside the projector (not shown) by means of the frame 13. The position of the lamp 11 in such a structure is not adjustable. If the position of the lamp is not desirable after the light source adjusting device 10 is installed into the projector, the light source adjusting device 10 must be re-installed.

To improve the lighting efficiency of the light source adjusting device in the projector, a sequential color recapture (SCR) technique is adopted in the prior art to achieve the desired lighting efficiency. Please refer to FIG. 2, which is a schematic view showing the light source adjusting device of the conventional projector using the sequential color recapture technique. As shown in FIG. 2, a reflector 24 is disposed at the inner side of the opening 23 of the integration rod 22, so that the incidence light provided by the lamp 25 merely goes through a tiny aperture 26 of the integration rod 22 by recapturing the reflected light. Such technique certainly improves the lighting efficiency of the light source adjusting device in the projector. However, the focal point of the lamp 25 must be precisely positioned at the center of the integration rod 22 to lower the lighting loss. Because the position of the lamp fails to be dynamically adjusted in the light source adjusting device of the conventional projector, such technique is still hard to be implemented. Therefore, such issue would be overcome if the lamp could be dynamically adjusted to the focal position.

Please refer to FIG. 3, which is a schematic view showing the outside of a projector. The projector 30 includes a housing 31, a cover 32, an opening 33 and a plurality of control buttons 34. All of the internal components of the projector 30 are placed inside the housing 31. After all of the internal components are assembled, the cover 32 is used to cover the projector 30 so that the assembly of the projector 30 is completed. The cover 32 is located on the front side or the rear side of the housing 31 of the projector 30. Depending on the design of the projector 30, the opening 33 is used for the light source to pass therethrough. The control buttons 34 are used to control all functions of the projector 30. The number and functions of the control buttons varies with the model of the projector 30. Owing to the structural complication and arduous processing regarding the adjusting module of the light source adjusting device in the prior art, the housing of the entire projector must be disassembled before the lamp is adjusted. Hence, the assembly of the housing could only be proceeded after the completion of the lamp adjustment. In addition to the time spent for adjusting the lamp position, the reassembly of the housing also costs plenty of time and labor. This causes a hurdle in the production process and a hike on the cost. To cope with the limitation, the implementation of a modified lamp adjusting device is indispensable.

Based on the above, in order to overcome the drawbacks in the prior art, the present invention provides an improved light source adjusting device, which obviously enhances the adjustment of the lamp to a focal position.

SUMMARY OF THE INVENTION

In accordance with a first aspect of the present invention, a light source adjusting device for a projector is provided. The light source adjusting device includes a base; an adjusting frame having a containing housing; a lamp disposed inside the containing housing as a light source of the projector; a connecting frame connected between the base and the adjusting frame; a first adjusting element disposed on the base and connected with the connecting frame; and a second adjusting element disposed on the base and connected with the adjusting frame, wherein the second adjusting element and the first adjusting element are disposed coplanarly, and a position of the connecting frame is adjusted by adjusting the first adjusting element and a position of the adjusting frame is adjusted by adjusting the second adjusting element, thereby driving the lamp so as to adjust a focal position of the light source adjusting device.

Preferably, the first adjusting element is one of an eccentric element and a displacing device.

Preferably, the connecting frame has a slot for accommodating the eccentric element so that the position of the connecting frame is adjusted by the eccentric element.

Preferably, the second adjusting element is a screw sleeved in an elastic element.

Preferably, the connecting frame is connected with the base by means of a plurality of screws.

Preferably, the connecting frame is connected with the adjusting frame by means of a plurality of screws.

Preferably, the connecting frame is connected with the adjusting frame by a rotation shaft.

In accordance with a second aspect of the present invention, a light source adjusting device for a projector is provided. The light source adjusting device includes a base; a lamp device having a connector and connected with the base by the connector, the lamp device being used for providing a light source of the projector; a first adjusting element disposed on the base and connected with the connector; and a second adjusting element disposed on the base and urged against the lamp device, wherein the first adjusting element and the second adjusting element are disposed coplanarly, and a position of the connector is adjusted by adjusting the first adjusting element and a position of the lamp device is adjusted by adjusting the second adjusting element, thereby adjusting a focal position of the light source.

Preferably, the first adjusting element is one of an eccentric element and a displacing device.

Preferably, the second adjusting element is a screw sleeved in an elastic element.

Preferably, the lamp device further comprises an adjusting frame and a lamp.

In accordance with a third aspect of the present invention, a lamp adjusting device for a projector is provided. The lamp adjusting device includes a base; an adjusting frame having a containing housing for accommodating a lamp therein; a connecting frame connected between the base and the adjusting frame; a first adjusting element disposed on the base and connected with the connecting frame; and a second adjusting element disposed on the base and connected with the adjusting frame, wherein the second adjusting element and the first adjusting element are disposed coplanarly, and a position of the connecting frame is adjusted by adjusting the first adjusting element and a position of the adjusting frame is adjusted by adjusting the second adjusting element, thereby driving the lamp so as to adjust a focal position of the lamp.

Preferably, the first adjusting element is one of an eccentric element and a displacing device.

Preferably, the connecting frame has a slot for accommodating the eccentric element so that the connecting frame is adjusted by the eccentric element.

Preferably, the second adjusting element is a screw sleeved in an elastic element.

Preferably, the connecting frame is connected with the base by means of a plurality of screws.

Preferably, the connecting frame is connected with the adjusting frame by a rotation shaft.

The foregoing and other features and advantages of the present invention will be more clearly understood through the following descriptions with reference to the drawing, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

In order to conveniently adjust the focal position of a lamp of the light source adjusting device for a projector and solve the trouble in reassembling the overall projector after the lamp is adjusted to a new position, a special design is provided by the present invention. Through the special design of the present invention, the light source adjusting device of the projector are positioned on the same plane for the adjustment of the focal position of a lamp. This not only improves the adjustment speed and the precision, but reduces the reassembly time.

Figure 4:
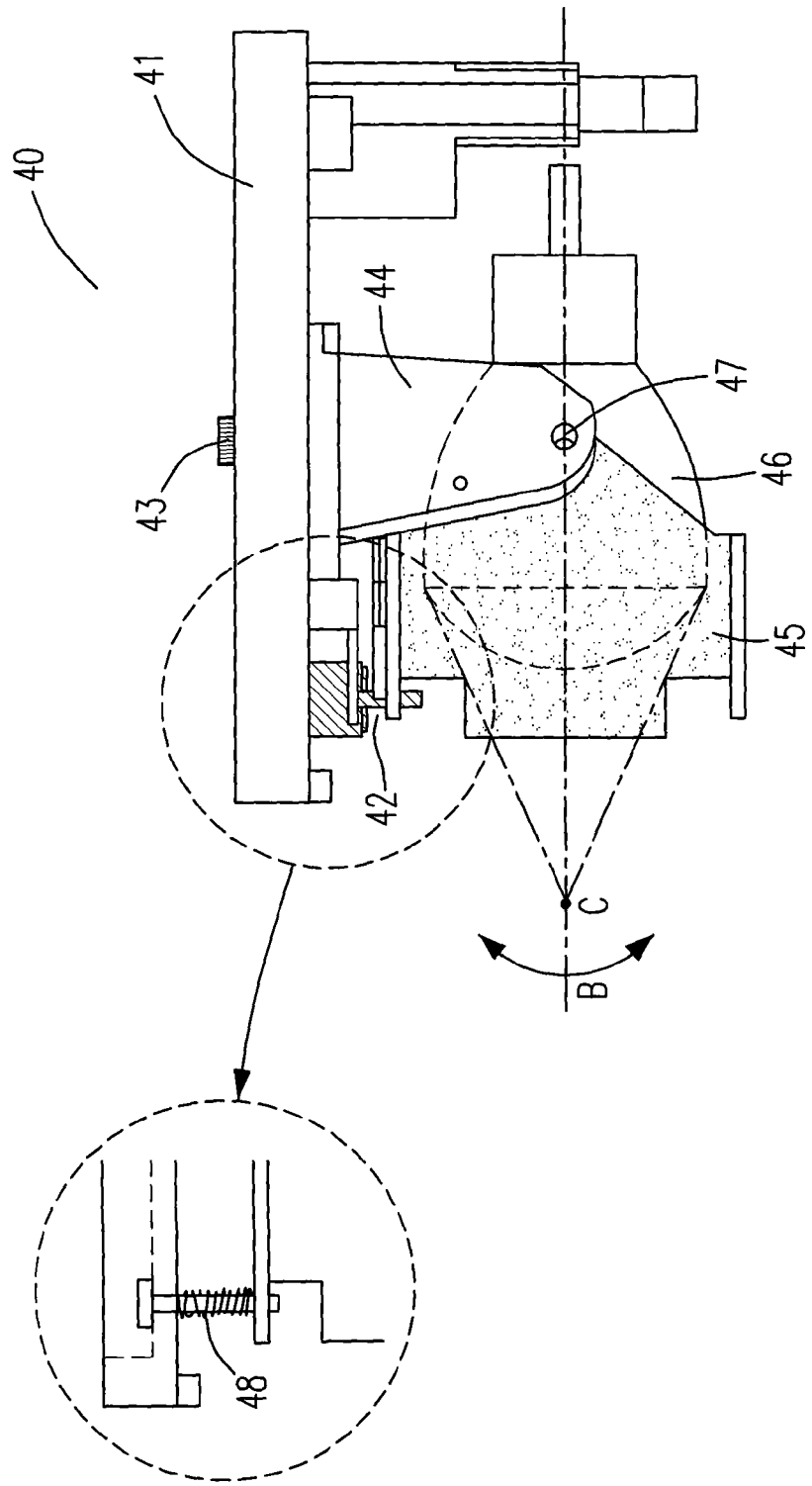
FIG. 4 is a side view showing the element configuration of the light source adjusting device of a projector according to a preferred embodiment of the present invention.

Please refer to FIG. 4, which is a side view showing the element configuration of the light source adjusting device of a projector according to a preferred embodiment of the present invention. The light source adjusting device 40 of the projector includes a base 41, an adjusting frame 45, a lamp 46, a connecting frame, a rotation shaft 47, a first adjusting element 43 and a second adjusting element 42. The base 41 is used for all parts of the light source adjusting device to be disposed thereon. The adjusting frame 45 has a containing housing (not shown) for accommodating a lamp 46 of the light source adjusting device 40, wherein the lamp 46 is used to provide the light for the projector. One side of the connecting frame 44 is connected with the base 41 and the other side thereof is connected with the adjusting frame 45 by means of the rotation shaft 47. Besides the rotation shaft 47, the adjusting frame 45 could also be connected with the connecting frame 44 through a plurality of screws.

The adjustment for the light source adjusting device 40 of the projector is performed by the first adjustment element 43 and the second adjustment element 42. In the following, how the first adjustment element 43 and the second adjustment element 42 are connected with the connecting frame 44 and the adjusting frame 45 would be illustrated first, followed by the illustration of how to adjust the position of the lamp 46 by the first and the second adjusting elements 43 and 42. The first adjusting element 43 is disposed on one side of the base 41. The connecting frame 44 is connected with the base 41. Meanwhile, there is a slot (not shown) on the connecting frame 44. The slot is located on one side of the connecting frame 44 adjacent to the base 41 for accommodating the first adjusting element 43. The relative position between the connecting frame 44 and the base 1 is adjusted by adjusting the first adjusting element 43. Preferably, the first adjusting element 43 is an eccentric element, e.g. an eccentric screw or a cam. The second adjusting element 42, which is coplanarly disposed on one side of the base 41 along with the first adjustment element 43, is connected with the adjusting frame 45 and the base 41. Preferably, the second adjusting element 42 is the combination of a screw and an elastic element 48, e.g. a spring, to provide the restoring force for the adjustment of the screw.

Figure 5:
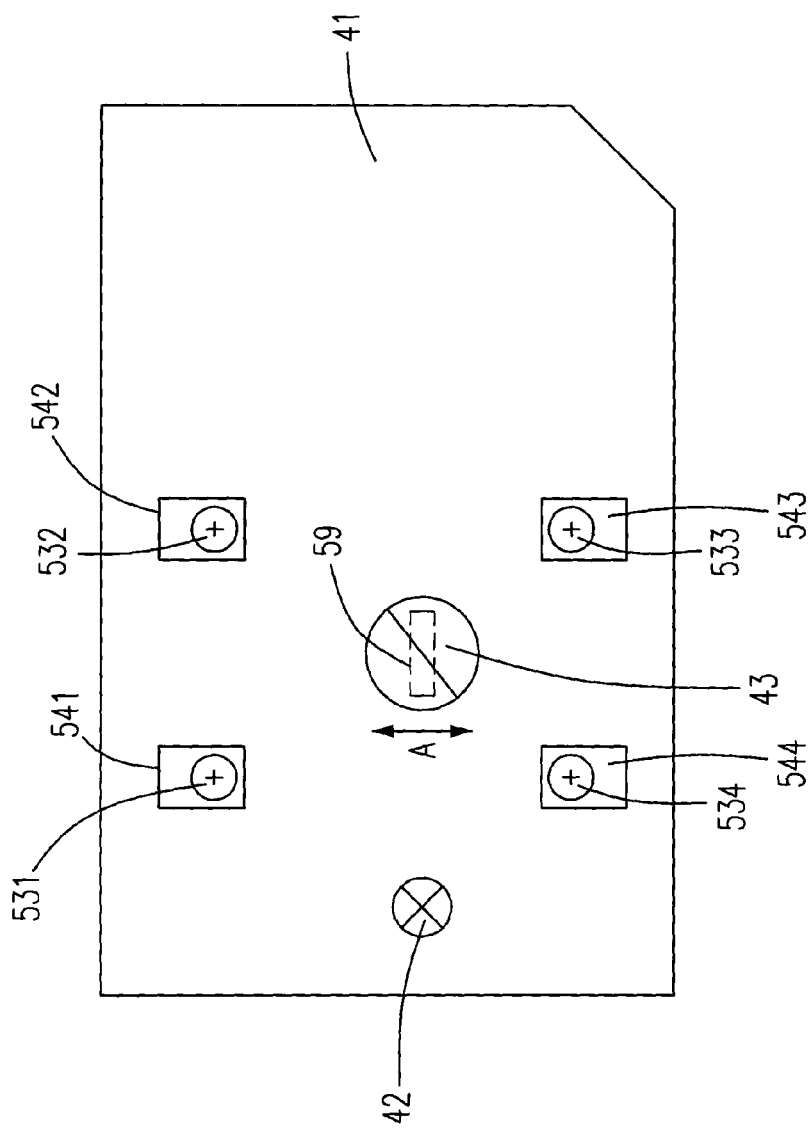
FIG. 5 is a top view showing the base structure of the light source adjusting device of a projector according to a preferred embodiment of the present invention.

As for the adjustment means of the position of the lamp 46, please refer to both FIGS. 4 and 5. FIG. 5 is a top view showing the base structure of the light source adjusting device of a projector in the present invention. There are a first adjusting element 43, a second adjusting element 42, plural screws 531, 532, 533 and 534 and plural guides 541, 542, 543 and 544 corresponding to the screws 531, 532, 533 and 534 on the base 41. As shown in FIG. 5, a slot 59 is located on the connecting frame 44. The position of the slot 59 is presented in FIG. 5 in a perspective view. The slot 59 is used to accommodate the first adjusting element 43, through which the first adjusting element 43 is adjusted and moved in the slot 59. The screws 531, 532, 533 and 534 and the guides 541, 542, 543 and 544 corresponding to the screws 531, 532, 533 and 534 are used to connect the base 41 and the connecting frame 44. Moreover, the positions and number of these screws are changeable according to different types of projectors. Please refer to both FIGS. 4 and 5. While rotated, the first adjustment element 43, such as an eccentric screw, will drive the connecting frame 44 to move leftwards or rightwards along the slot by direction marked by the arrow A in FIG. 5, and the position of the connecting frame 44 relative to the base 41 is adjusted accordingly. After the connecting frame 44 is moved, the adjusting frame 45 connected with the connecting frame will be driven to move. Meanwhile, the position of the lamp 46 is moved as well. After the connecting frame 44 is adjusted to an optimal position through the first adjusting element 43, the positions of the screws 531, 532, 533 and 534 are adjusted so that the connecting frame 44 could be fixed on the base 41. The guides 541, 542, 543 and 544 corresponding to the screws 531, 532, 533 and 534 serve as the fine-tuning means for correcting the positions of the screws 531, 532, 533 and 534. After the fine-tuning is completed, the adhesive is applied to fix the first adjusting element 43 and the screws 531, 532, 533 and 534.

Figure 1:
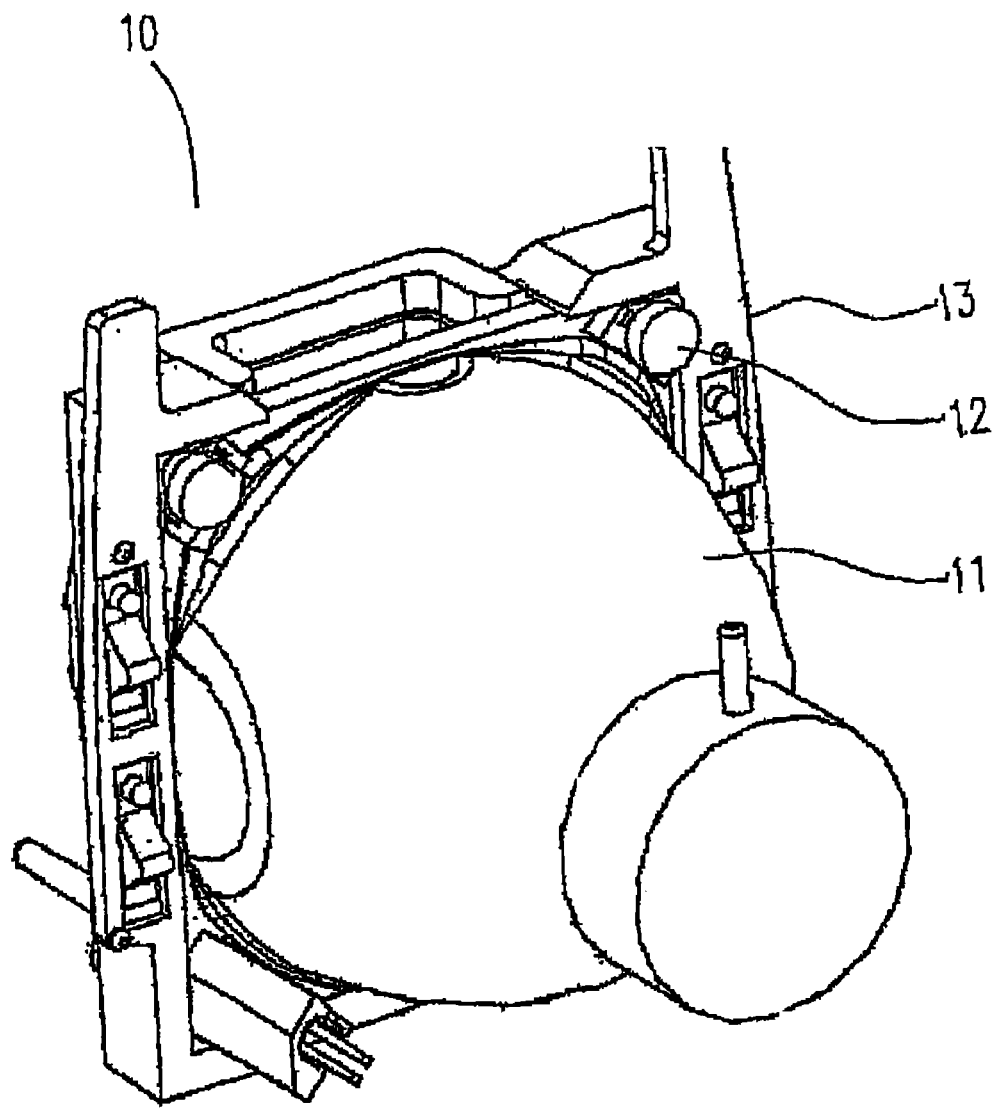
FIG. 1 is a schematic view showing the light source adjusting device of the conventional projector.
Figure 2:
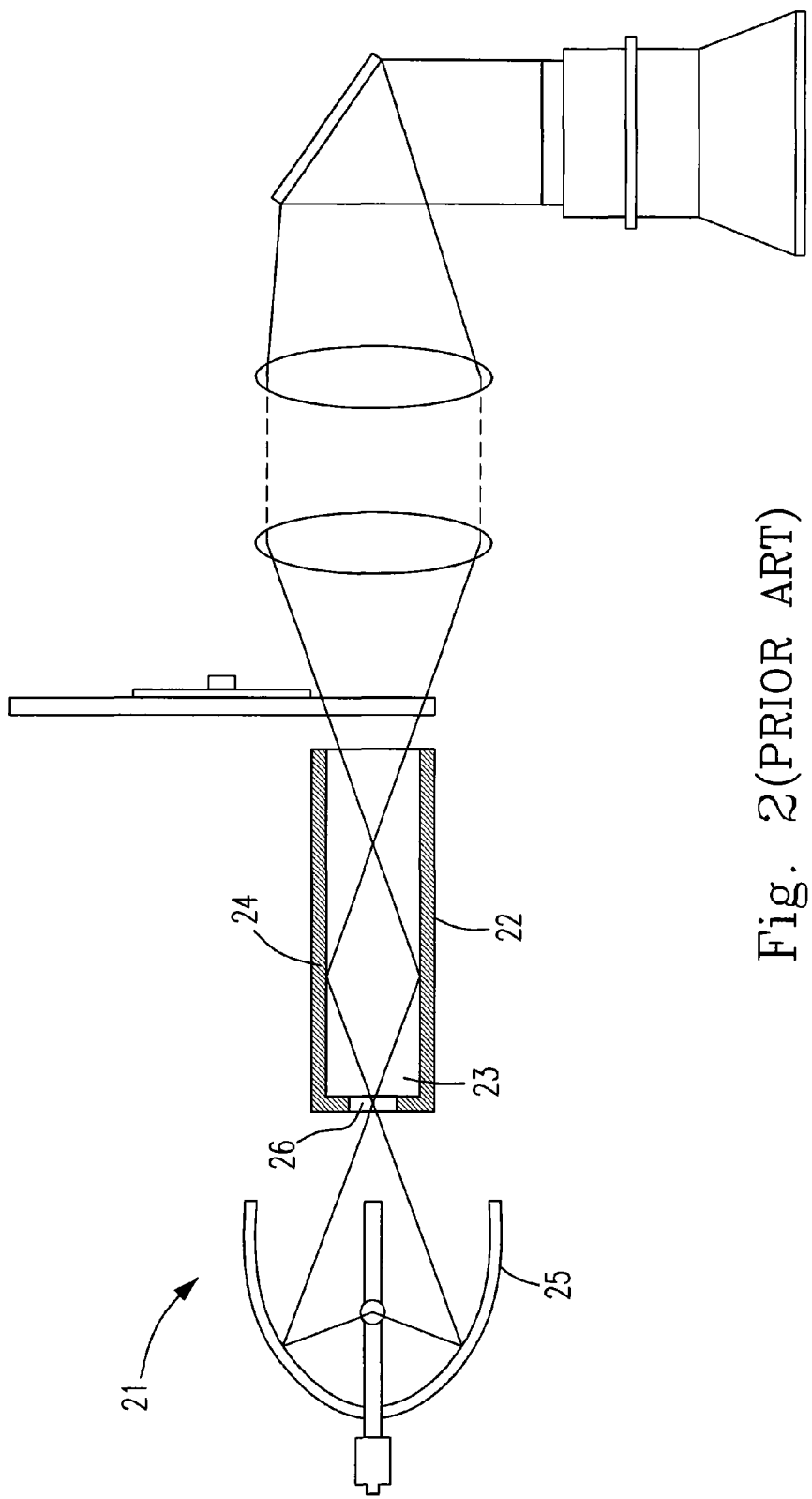
FIG. 2 is a schematic view showing the light source adjusting device of the conventional projector using the sequential color recapture technique.
Figure 3:
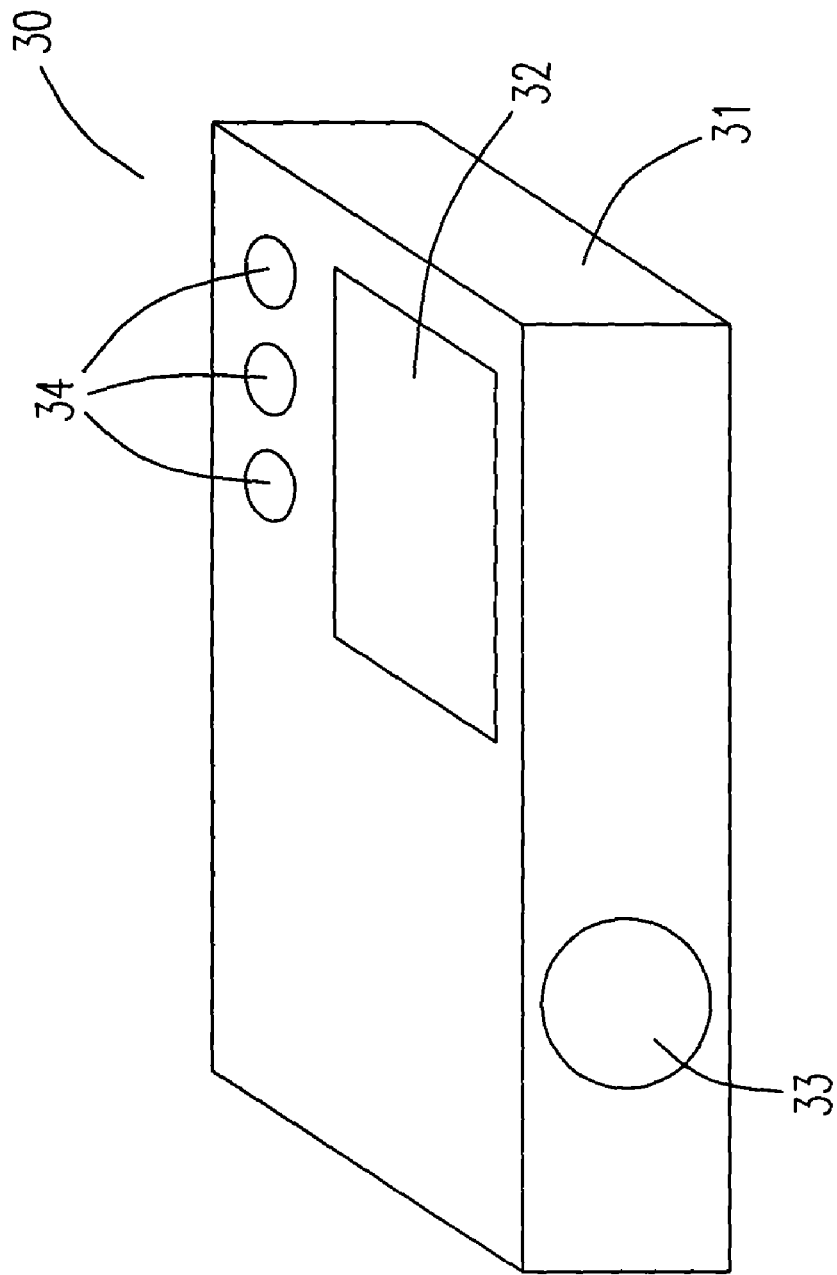
FIG. 3 is a schematic view showing the outside of a projector.

On the other hand, the position of the lamp 46 is adjusted along the direction marked by arrow B of FIG. 4 by rotating the screw of the second adjusting element 42 which is disposed coplanarly with the first adjusting element 43. Regarding the arc represented by the arrow B, it is treated as a straight line as the adjustment angle is between 1-2°. When the screw of the second adjusting element 42 is rotated upwardly or downwardly, the adjusting frame 45 is driven to be moved upwardly or downwardly, and thus the lamp 46 is moved to an optimal position. After the adjustment along the direction of arrow B, the second adjusting element 42 is fixed with the adhesive. By now the adjusting frame 45 and the lamp 46 are both located at the optimal positions and are fixed. After the positioning of the light source adjusting device 40 of the projector is fixed, the cover 32 shown in FIG. 3 is bolted with screws, so that the focal distance adjustment for the light source adjusting device 40 is completed.

Figure 6:
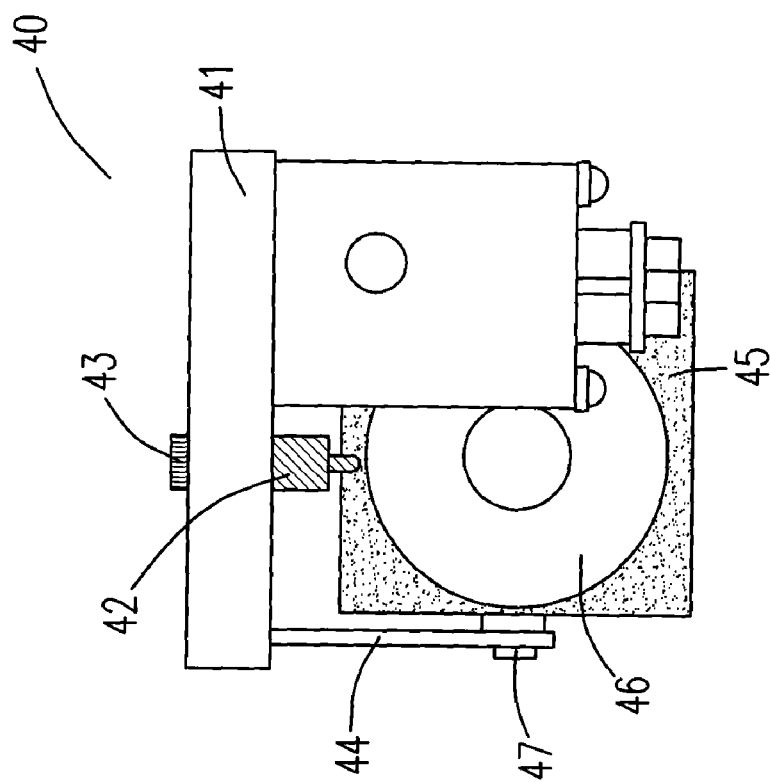
FIG. 6 is a rear view showing the element configuration of the light source adjusting device of a projector according to a preferred embodiment of the present invention.
Figure 7:
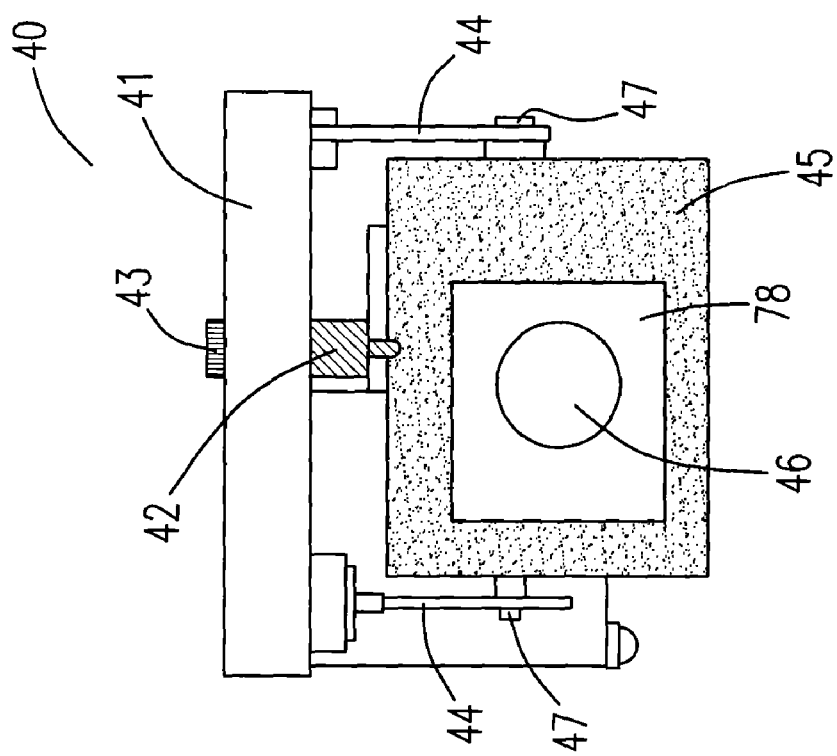
FIG. 7 is a front view showing the element configuration of the light source adjusting device of a projector according to a preferred embodiment of the present invention.

To better illustrate the elements of the present invention, the following figures are shown using several views in different perspectives to show the element configuration of the light source adjusting device of a projector according to a preferred embodiment of the present invention. Please refer to FIG. 6, which is a rear view showing the element configuration of the light source adjusting device of a projector according to a preferred embodiment of the present invention. The light source adjusting device 40 of the projector includes a base 41, an adjusting frame 45, a lamp 46, a connecting frame 44, a rotation shaft 47, a first adjusting element 43 and a second adjusting element 42. Please refer to FIG. 7, which is the front view showing the element configuration of the light source adjusting device of a projector according to a preferred embodiment of the present invention. The light source adjusting device 40 of the projector includes a base 41, an adjusting frame 45, a lamp 46, a containing housing 78 and a second adjusting element 42.

In conclusion, the present invention provides a light source adjusting device of a projector. The light source adjusting device utilizes a connecting frame, an adjusting frame, a first adjusting element and a second adjusting element, which is disposed coplanarly with the first adjusting element, to form a practical device, wherein the focal distance of the lamp is adjusted along two directions on the same plane. Through the light source adjusting device of the present invention, not only the adjustment precision of the light source position is enhanced, but the housing of the projector is unnecessary to be reassembled after the adjustment of the light source position, so that the light source adjusting device of the present invention could be adjusted simply by opening the cover of the projector. Besides, the production cost could be greatly lowered down through the present invention. Therefore, the present invention has the advantages of reducing the number of elements, saving the production time and procedure, lowering down the production cost, enhancing the precision and meeting the demand for operational convenience in this technology field. Based on the above, the present invention addresses a solution with the industrial value, which is innovative, progressive and practical.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A light source adjusting device for a projector, comprising:
   a base;
   an adjusting frame having a containing housing;
   a lamp disposed inside said containing housing as a light source of said projector;
   a connecting frame connected between said base and said adjusting frame, wherein said connecting frame is connected with said adjusting frame by a rotation shaft;
   a first adjusting element directly mounted on said base and connected with said connecting frame; and
   a second adjusting element directly mounted on said base and connected with said adjusting frame, wherein said second adjusting element and said first adjusting element are disposed coplanarly, and a position of said connecting frame is adjusted by adjusting said first adjusting element and a position of said adjusting frame is adjusted by adjusting said second adjusting element in a vertical arc-shaped movement around said rotation shaft, thereby driving said lamp so as to adjust a focal position of said light source adjusting device.

2. The light source device of claim 1, wherein said first adjusting element is one of an eccentric element and a displacing device.

3. The light source device of claim 2, wherein said connecting frame has a slot for accommodating said eccentric element so that said position of said connecting frame is adjusted by said eccentric element.

4. The light source device of claim 1, wherein said second adjusting element is a screw sleeved in an elastic element.

5. The light source device of claim 1, wherein said connecting frame is connected with said base by means of a plurality of screws.

6. The light source device of claim 1, wherein said connecting frame is connected with said adjusting frame by means of a plurality of screws.

7. A light source adjusting device for a projector, comprising:
   a base;
   a lamp device having a connector and connected with said base by said connector, wherein said connector is connected with a rotation shaft, and the lamp device is used for providing a light source of said projector;
   a first adjusting element directly mounted on said base and connected with said connector; and a second adjusting element directly mounted on said base and urged against said lamp device, wherein said first adjusting element and said second adjusting element are disposed coplanarly, and a position of said connector is adjusted by adjusting said first adjusting element and a position of said lamp device is adjusted by adjusting said second adjusting element in a vertical arc-shaped movement around said rotation shaft, thereby adjusting a focal position of said light source.

8. The light source adjusting device of claim 7, wherein said first adjusting element is one of an eccentric element and a displacing device.

9. The light source adjusting device of claim 7, wherein said second adjusting element is a screw sleeved in an elastic element.

10. The light source adjusting device of claim 7, wherein said lamp device further comprises an adjusting frame and a lamp.

11. A lamp adjusting device for a projector, comprising:
a base;
an adjusting frame having a containing housing for accommodating a lamp therein;
a connecting frame connected between said base and said adjusting frame, wherein said connecting frame is connected with said adjusting frame by a rotation shaft;
a first adjusting element directly mounted on said base and connected with said connecting frame; and
a second adjusting element directly mounted on said base and connected with said adjusting frame, wherein said second adjusting element and said first adjusting element are disposed coplanarly, and a position of said connecting frame is adjusted by adjusting said first adjusting element and a position of said adjusting frame is adjusted by adjusting said second adjusting element in a vertical arc-shaped movement around said shaft, thereby driving said lamp so as to adjust a focal position of said lamp.

12. The light source adjusting device of claim 11, wherein said first adjusting element is one of an eccentric element and a displacing device.

13. The light source adjusting device of claim 12, wherein said connecting frame has a slot for accommodating said eccentric element so that said connecting frame is adjusted by said eccentric element.

14. The light source adjusting device of claim 11, wherein said second adjusting element is a screw sleeved in an elastic element.

15. The light source adjusting device of claim 11, wherein said connecting frame is connected with said base by means of a plurality of screws.

* * * * *